(12) United States Patent
Wada

(10) Patent No.: US 10,884,242 B2
(45) Date of Patent: Jan. 5, 2021

(54) DISPLAY APPARATUS AND DISPLAY METHOD

(71) Applicant: JVC KENWOOD Corporation, Yokohama (JP)

(72) Inventor: Yuki Wada, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 100 days.

(21) Appl. No.: 16/184,819

(22) Filed: Nov. 8, 2018

(65) Prior Publication Data

US 2019/0079286 A1 Mar. 14, 2019

Related U.S. Application Data

(63) Continuation of application No. PCT/JP2017/035999, filed on Oct. 3, 2017.

(30) Foreign Application Priority Data

Dec. 6, 2016 (JP) .................... 2016-236405

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
CPC ............ G02B 27/0101; G02B 27/0172; G02B 2027/0118; G02B 2027/0178;
(Continued)

(56) References Cited

U.S. PATENT DOCUMENTS 5,504,622 A * 4/1996 Oikawa .................. B60K 37/02
359/630
6,359,737 B1 * 3/2002 Stringfellow ...... G02B 27/0101
250/214 VT
(Continued)

FOREIGN PATENT DOCUMENTS

CN 206856500 U 1/2018
CN 207752232 U 8/2018
(Continued)

*Primary Examiner* — William R Alexander
*Assistant Examiner* — Sharrief I Broome
(74) *Attorney, Agent, or Firm* — Procopio, Cory, Hargreaves & Savitch LLP

(57) ABSTRACT

A display apparatus includes: a display surface configured to display an image; and a concave mirror configured to reflect light beams from the display surface toward a transparent member, in which a virtual image of the image is presented by the transparent member. An optical path after a first light beam is reflected in the transparent member coincides with an optical path after a second light beam is reflected in the transparent member by the reflection in the concave mirror, the first light beam reaching the transparent member from one point on the display surface and reflecting on a front surface of the transparent member, and the second light beam reaching the transparent member from the one point and reflecting on a rear surface of the transparent member.

5 Claims, 5 Drawing Sheets

(51) Int. Cl.
  *B60R 11/02* (2006.01)
  *G02B 5/10* (2006.01)
  *G01C 21/36* (2006.01)
(52) U.S. Cl.
  CPC ........ *G02B 5/10* (2013.01); *B60K 2370/1529* (2019.05); *B60K 2370/23* (2019.05); *B60K 2370/334* (2019.05); *G01C 21/365* (2013.01); *G02B 2027/012* (2013.01); *G02B 2027/0121* (2013.01)
(58) Field of Classification Search
  CPC ...... G02B 2027/0123; G02B 2027/011; G02B 2027/013; G02B 27/017; G02B 27/0149; G02B 2027/015; G02B 2027/0138; G02B 2027/014; G02B 27/01; G02B 27/0176; G02B 5/30; G02B 27/283; G02B 2027/0159; G02B 2027/0194; G02B 2027/012; G02B 2027/0132; B60K 35/00; B60K 2370/1529; B60K 2370/334; B60K 2370/23; B60K 2370/66; B60K 2370/691; B60K 2370/785; B60K 37/04; B60K 2370/1534; B60K 2370/155; B60K 2370/177; B60K 2370/197; B60K 2370/21; B60K 2370/25; B60K 2370/31; B60K 2370/35; B60K 2370/52; B60K 2370/682; B60K 2370/693; B60K 2370/81; G09G 3/2003; G09G 2310/0235; G09G 2340/0471; G09G 2340/0478; G09G 3/32; G09G 3/3208; G09G 3/3225; G09G 3/3233; G09G 3/34; G09G 5/00; G09G 2320/0626; G09G 2354/00; G09G 2360/14; G09G 2360/144; G09G 2380/10; G09G 3/02; G09G 3/2096; G09G 3/3406; G09G 3/3413

See application file for complete search history.

(56) References Cited

U.S. PATENT DOCUMENTS

| | | | | |
|---|---|---|---|---|
| 7,158,095 | B2* | 1/2007 | Jenson | G02B 27/0101 345/207 |
| 2007/0148472 | A1* | 6/2007 | Masaki | B32B 17/10036 428/426 |
| 2010/0314900 | A1 | 12/2010 | Labrot et al. | |
| 2013/0188260 | A1 | 7/2013 | Junichi et al. | |
| 2016/0048017 | A1* | 2/2016 | Kasahara | G02B 17/006 359/633 |
| 2016/0334637 | A1* | 11/2016 | Saisho | G02B 3/0006 |
| 2018/0067308 | A1* | 3/2018 | Sakai | G02B 27/0101 |

FOREIGN PATENT DOCUMENTS

| | | |
|---|---|---|
| EP | 1800855 A1 | 6/2007 |
| JP | 2011-505330 A | 2/2011 |
| JP | 2012-58688 A | 3/2012 |
| WO | 2012/036099 A1 | 3/2012 |

* cited by examiner

DISPLAY APPARATUS AND DISPLAY METHOD

CROSS REFERENCE TO RELATED APPLICATION

This application is a Continuation of International Application No. PCT/JP2017/035999 filed on Oct. 3, 2017 which is based upon and claims the benefit of priority from Japanese Patent Application No. 2016-236405, filed on Dec. 6, 2016, and, the disclosure of which are incorporated herein in their entirety by reference.

BACKGROUND

The present disclosure relates to a display apparatus and a display method, and specifically relates to a display apparatus and a display method for presenting a virtual image.

A head-up display (HUD) for a vehicle is an apparatus for displaying information such as the speed of the vehicle, a warning, or a guidance display in a navigation system by reflecting this information in a windshield of the vehicle or a combiner, which is a semi-transparent reflection plate. In the HUD, video images are presented in such a way that they overlap the front visual field of a driver, whereby the driver is able to check vehicle information and the like without moving his or her line of sight much. Therefore, more and more vehicles have been equipped with the HUD as a safe display apparatus.

In general, when a video image is reflected on a transparent object such as glass, due to the light beam reflected on the front surface of the transparent object and the light beam reflected on the rear surface of the transparent object, a user such as a driver sees video images overlapping each other with some deviation between them. This phenomenon is called a double image. As a method of cancelling the double image, a method of changing the reflection angles of the light beams by forming a small angle having a wedge shape between the front surface and the rear surface of the transparent object such as glass to thereby make the two images coincide with each other has been known (e.g., Published Japanese Translation of PCT International Publication for Patent Application, No. 2011-505330 and Japanese Unexamined Patent Application Publication No. 2012-58688).

SUMMARY

When the double image is prevented by forming a small angle having a wedge shape in the windshield like the method disclosed in Published Japanese Translation of PCT International Publication for Patent Application, No. 2011-505330 etc., such a special process needs to be performed on the windshield. Further, in the method disclosed in Japanese Unexamined Patent Application Publication No. 2012-58688, the combiner needs to be processed into a wedge shape. That is, in the methods disclosed in these literatures, the transparent member to present the image needs to be processed into a wedge shape. Therefore, a technique for preventing the double image even when the transparent member to present the image is not processed into a wedge shape is required.

This embodiment provides a display apparatus including: a display surface configured to display an image; and a concave mirror configured to reflect light beams from the display surface toward a transparent member reflecting some of the light beams that have been input thereto and transmitting the remaining light beams that have been input thereto, in which an optical path of a first light beam after the first light beam is reflected in the transparent member coincides with an optical path of a second light beam after the second light beam is reflected in the transparent member by the reflection in the concave mirror, the first light beam reaching the transparent member from one point on the display surface and reflecting on a front surface of the transparent member, and the second light beam reaching the transparent member from the one point and reflecting on a rear surface of the transparent member, and a virtual image of the image is presented by the transparent member.

This embodiment further provides a display apparatus including: a display surface configured to display an image; and a concave mirror configured to reflect light beams from the display surface toward a transparent member reflecting some of the light beams that have been input thereto and transmitting the remaining light beams that have been input thereto, in which a first light beam and a second light beam that reach the transparent member from one point on the display surface are incident on the transparent member in parallel to each other by the reflection in the concave mirror, and a virtual image of the image is presented by the transparent member.

This embodiment further provides a display method including: displaying an image on a display surface; reflecting light beams from the display surface toward a transparent member by a concave mirror, the transparent member reflecting some of the light beams that have been input thereto and transmitting the remaining light beams that have been input thereto; and presenting a virtual image of the image by the transparent member, in which, in the reflection by the concave mirror, the reflection is performed in such a way that an optical path of a first light beam after the first light beam is reflected in the transparent member coincides with an optical path of a second light beam after the second light beam is reflected in the transparent member by the reflection in the concave mirror, the first light beam reaching the transparent member from one point on the display surface and reflecting on a front surface of the transparent member, and the second light beam reaching the transparent member from the one point and reflecting on a rear surface of the transparent member.

This embodiment further provides a display method including: displaying an image on a display surface; reflecting light beams from the display surface toward a transparent member by a concave mirror, the transparent member reflecting some of the light beams that have been input thereto and transmitting the remaining light beams that have been input thereto; and presenting a virtual image of the image by the transparent member, in which, in the reflection by the concave mirror, the reflection is performed in such a way that a first light beam and a second light beam that reach the transparent member from one point on the display surface are incident on the transparent member in parallel to each other.

DETAILED DESCRIPTION

Figure 1:
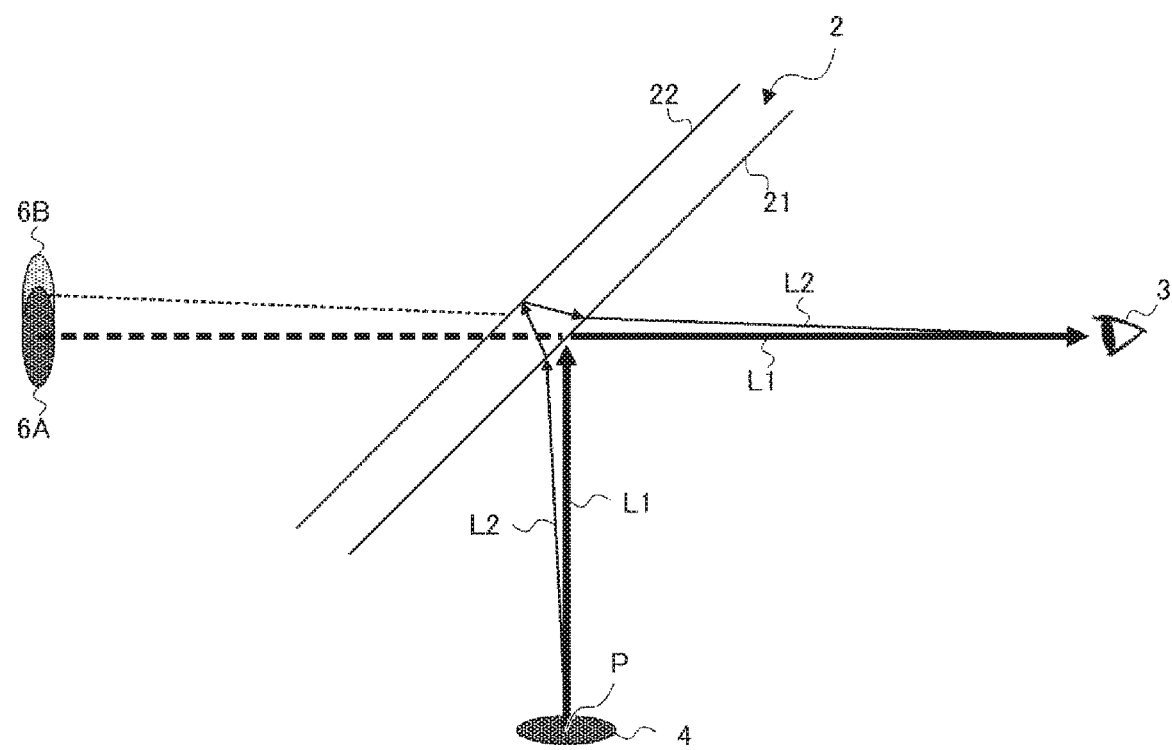
FIG. 1 is a schematic view showing a principle of occurrence of a double image.

First, the content of the matters studied by the inventors in advance will be explained. FIG. 1 is a schematic view showing a principle of occurrence of a double image. FIG. 1 shows a state in which light from an object 4 is reflected in a transparent member 2 such as a windshield having a front surface and a rear surface parallel to each other and the reflected light reaches an eye 3 of a user. Of a light flux from a point P on the object 4, a first light beam that is reflected on a front surface 21 of the transparent member and reaches the eye 3 is denoted by a light beam L1 and a second light beam that is reflected on a rear surface 22 of the transparent member and reaches the eye 3 is denoted by a light beam L2. In FIG. 1, the light beam L1 is shown by a thick solid arrow and the light beam L2 is shown by a thin solid arrow. The same is true for FIGS. 2, 4, and 5 that will be described later. The light beam L1 is reflected on the front surface 21 without passing inside the transparent member 2 and then reaches the eye 3. On the other hand, the light beam L2 is refracted when it is incident on the transparent member 2, passes inside the transparent member 2, reflected on the rear surface 22, refracted again, and then reaches the eye 3, as shown in FIG. 1. In this case, since there is a difference between the angles of the two light beams from the transparent member 2 to the eye 3, a deviation occurs between the position of a virtual image 6A created by the light beam L1 and the position of a virtual image 6B created by the light beam L2. Therefore, the eye 3 of the user sees the virtual images overlapping each other with some deviation between them. The phenomenon of the double image thus occurs.

Figure 2:
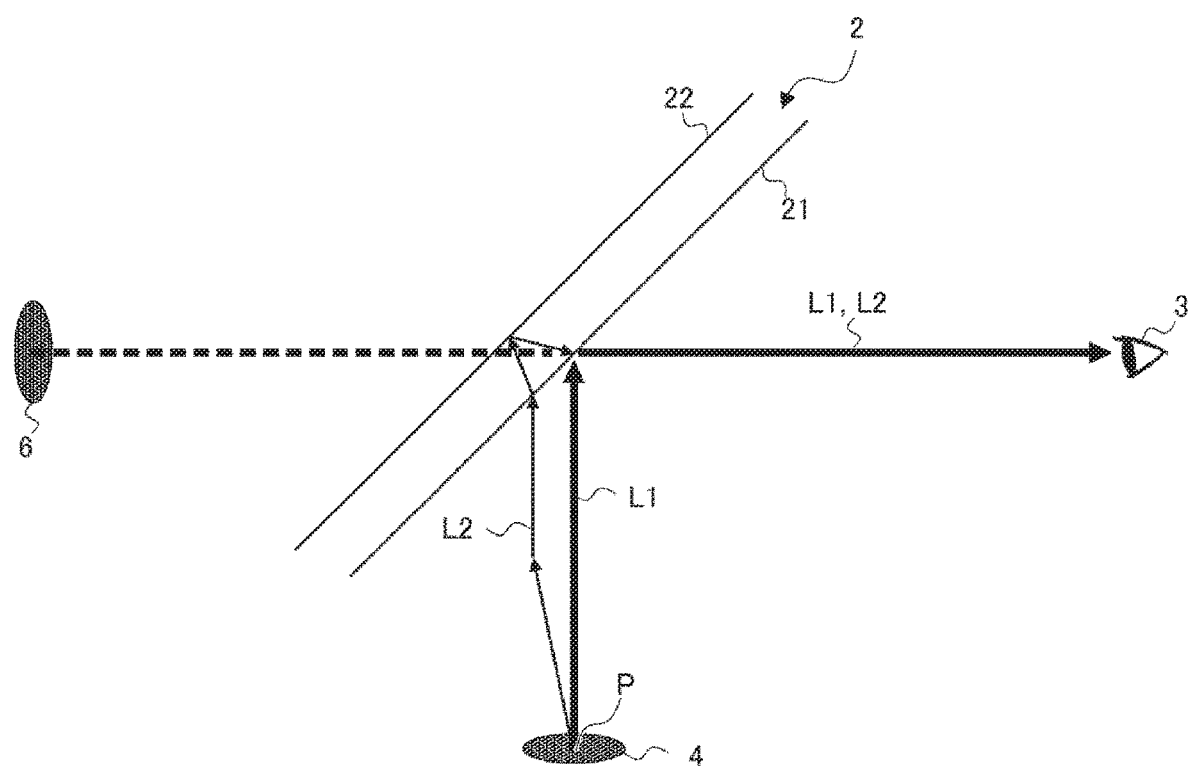
FIG. 2 is a schematic view showing an optical path to prevent an image from being seen as a double image.

Therefore, as shown in FIG. 2, when the two light beams L1 and L2 reflected in the transparent member 2 reach the eye 3 from one direction, one virtual image 6 is seen, rather than the double image. That is, it is required that the light beam L1 reflected on the front surface 21 of the transparent member 2 and the light beam L2 reflected on the rear surface 22 overlap each other and reach the eye 3. In this case, the two light beams L1 and L2 before they are reflected in the transparent member 2 are parallel to each other. This can be derived from Snell's law. In other words, when the two light beams L1 and L2 are incident on the transparent member 2 in parallel to each other, the light beams overlap each other after the reflection. In order to allow the user to see the two images made by the two light beams L1 and L2 that coincide with each other with no deviation between them, it is required that both of the two light beams L1 and L2 be light beams output from one point P. In order to achieve this structure, as shown in FIG. 2, the light beam L2 from the point P may be bent in the middle of the optical path before it is incident on the transparent member 2.

Figure 3:
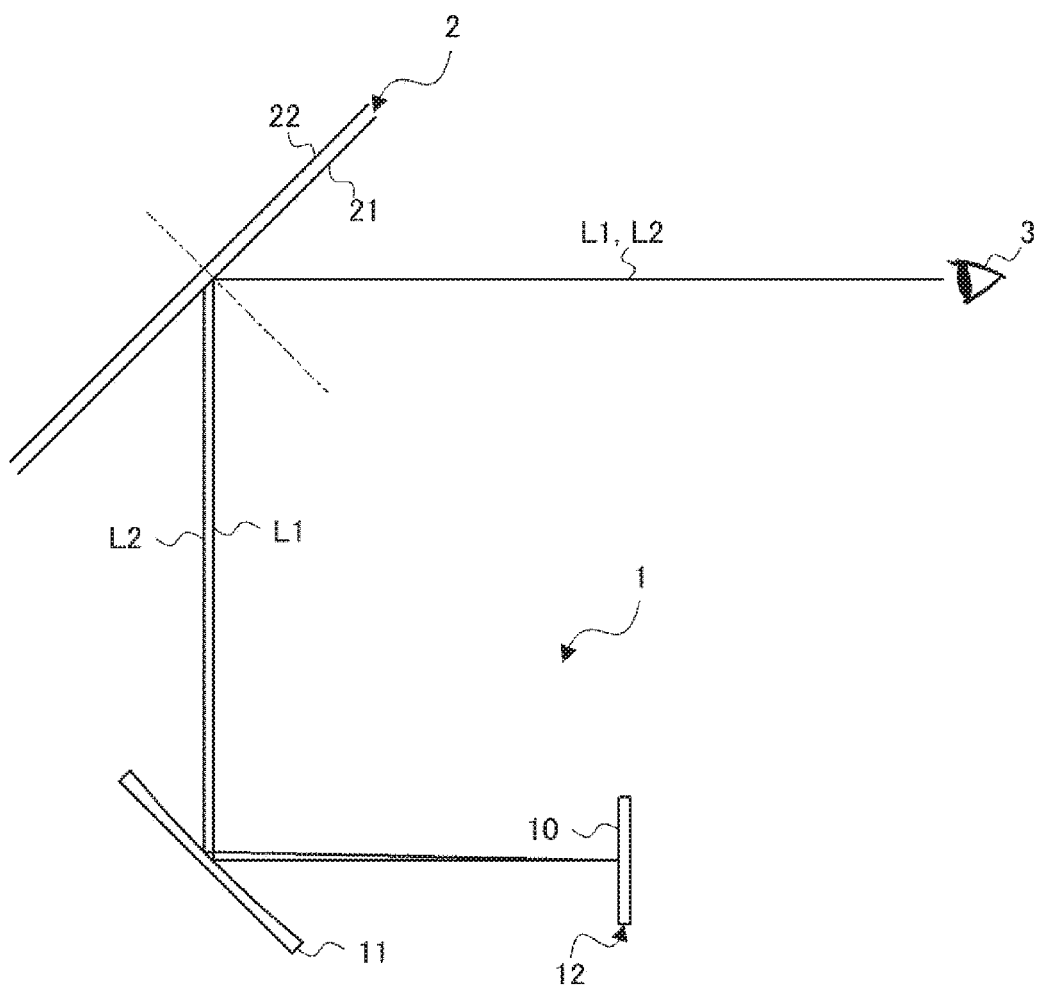
FIG. 3 is a schematic view showing one example of a structure of a display apparatus according to an embodiment.

In the following description, with reference to the drawings, an embodiment of the present disclosure will be explained. FIG. 3 is a schematic view showing one example of a structure of a display apparatus 1 according to this embodiment. FIG. 3 shows, besides the display apparatus 1, a transparent member 2 and an eye 3 of the user, in order to facilitate understanding. The display apparatus 1 is formed, for example, as a head-up display, and includes a display surface 10 and a concave mirror 11. The display apparatus 1 is, for example, mounted on a vehicle, and presents various kinds of information such as vehicle information to a driver. The display apparatus 1 reflects light from an image displayed on the display surface 10 in the transparent member 2, thereby presenting a virtual image of the image displayed on the display surface 10 to the user.

The display surface 10 displays images by light emission. While the display surface 10 is a display surface of a flat panel display 12 such as a liquid crystal display (LCD), a plasma display, or an organic EL display in this embodiment, the display surface 10 may be a screen on which an image is projected by a projector. In this embodiment, an image signal is input to the flat panel display 12 and the flat panel display 12 displays the image in accordance with the image signal on the display surface 10.

The transparent member 2, which is a member that reflects some of light beams that have been input thereto and transmits the remaining light beams that have been input thereto, presents a virtual image of the image of the display surface 10. While the transparent member 2 is a windshield in this embodiment, this is merely an example and the transparent member 2 may be a combiner or the like. The transparent member 2 does not have a wedge shape to prevent the double image. The transparent member 2 is formed of, for example, a glass having a flat plate shape or a curved shape having a front surface 21 and a rear surface 22 parallel to each other.

The light of the image projected onto the display surface 10 is reflected in the transparent member 2 and reaches the eye 3. Further, the light that has passed the transparent member 2 from the side of the rear surface 22 also reaches the eye 3. Therefore, these light beams overlay (overlap) and are then incident on the eye 3. Accordingly, the user is able to see both the video image information and the situation to the front of the vehicle at the same time.

Figure 4:
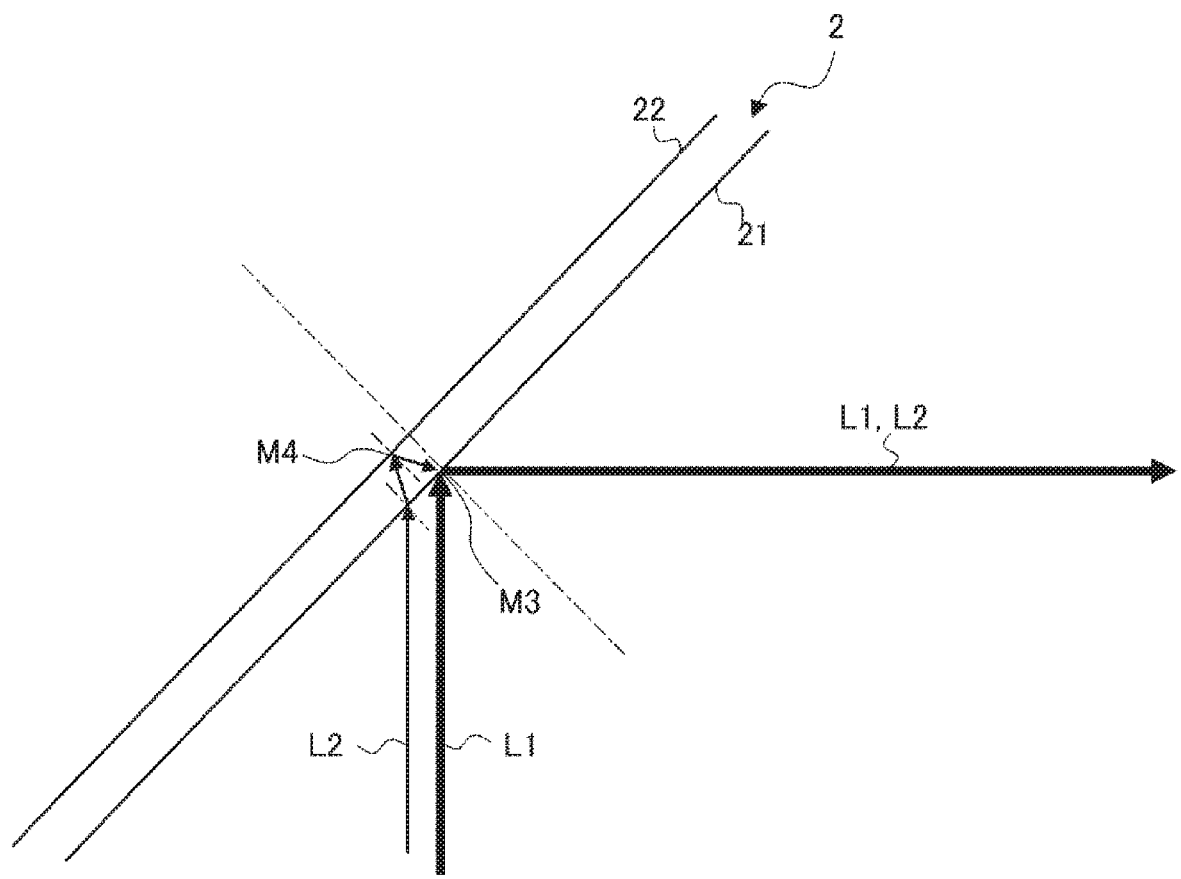
FIG. 4 is an enlarged view of an area near a transmission member in FIG. 3.

The concave mirror 11 is provided in the middle of the optical path from the display surface 10 to the transparent member 2, and reflects the light beams from the display surface 10 toward the transparent member 2. The concave mirror 11 is provided in such a way that the optical path of the first light beam L1 after the first light beam L1 that reaches the transparent member 2 from a desired one point P on the display surface and is reflected on the front surface 21 of the transparent member 2 is reflected in the transparent member 2 and the optical path of the second light beam L2 after the second light beam L2 that reaches the transparent member 2 from one point P and is reflected on the rear surface 22 of the transparent member 2 is reflected in the transparent member 2 coincide with each other, as shown in FIG. 3. In other words, the concave mirror 11 is provided in such a way that the first light beam L1 and the second light beam L2 that reach the transparent member 2 from one point P on the display surface 10 are incident on the transparent member 2 in parallel to each other, as shown in FIG. 4.

More specifically, the concave mirror 11 is installed while the distance on the optical path between the reflection surface of the concave mirror 11 having a predetermined curvature and the display surface 10 is adjusted in such a way that the optical paths after both of the light beams are reflected in the transparent member 2 coincide with each other; that is, in such a way that both of the light beams are incident on the transparent member 2 in parallel to each other. The target to be adjusted is not limited to the distance between the concave mirror 11 and the display surface 10 and may be the curvature of the concave mirror 11. That is, the curvature of the concave mirror 11 provided in such a way that it is spaced apart from the display surface 10 by a predetermined distance on the optical path may be adjusted in such a way that the optical paths after both of the light beams are reflected in the transparent member 2 coincide with each other; that is, in such a way that both of the light beams are incident on the transparent member 2 in parallel to each other. Both the curvature and the distance may be adjusted. The optical paths may not completely coincide with each other, although it is preferable that the optical paths completely coincide with each other. In a similar way, the light beams may not be completely in parallel to each other, although it is preferable that the light beams be completely in parallel to each other.

Figure 5:
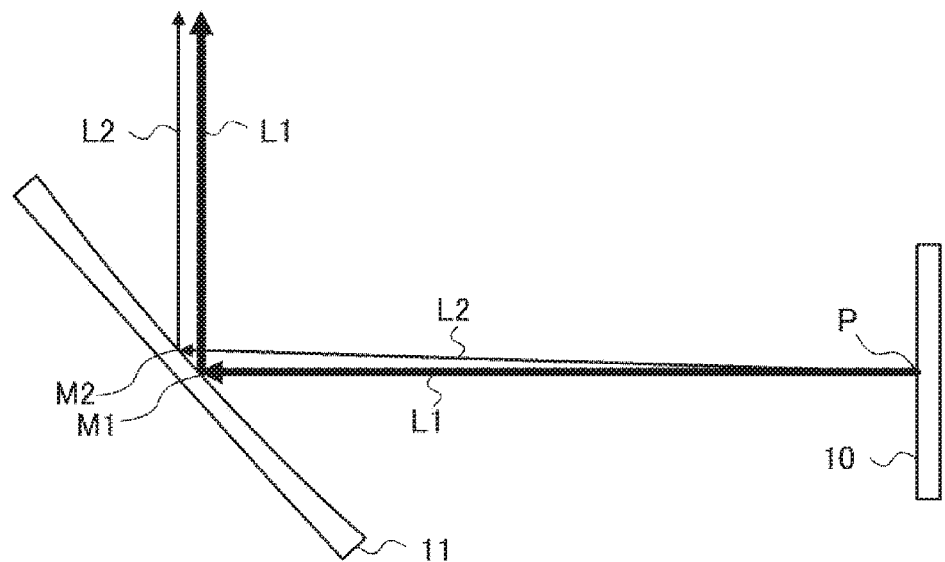
FIG. 5 is an enlarged view of an area near a concave mirror in FIG. 3.

FIG. 5 is an enlarged view of an area near the concave mirror 11 shown in FIG. 3. As shown in FIG. 5, the light beam L1 from the point P on the display surface 10 is reflected in a point M1 on the reflection surface of the concave mirror 11 and the light beam L2 from the point P on the display surface 10 is reflected in a point M2 on the reflection surface of the concave mirror 11. In this case, the traveling direction of the light beam L1 that is reflected in the point M1 and proceeds toward the transparent member 2 and the traveling direction of the light beam L2 that is reflected in the point M2 and proceeds toward the transparent member 2 are aligned to be parallel to each other by the reflection in the concave mirror 11. Therefore, as shown in FIG. 4, the light beam L1 and the light beam L2 that reach the transparent member 2 from one point P on the display surface 10 are made incident on the transparent member 2 in parallel to each other. The light beam L1 is reflected in a point M3 of the front surface 21 without passing inside the transparent member 2. On the other hand, the light beam L2 is refracted when it is incident on the transparent member 2, passes the inside of the transparent member 2, reflected in a point M4 of the rear surface 22, refracted again, and then emitted from the point M3 of the front surface 21 of the transparent member 2. In this case, the optical path of the light beam L1 and the optical path of the light beam L2 from the transparent member 2 to the eye 3 coincide with each other. While only the optical paths of the light emitted from the point P on the display surface 10 are shown in FIGS. 3 to 5 for the sake of clarity of explanation, the optical paths of the light emitted from each point on the display surface 10 are adjusted by the concave mirror 11 in a similar way. Therefore, occurrence of the double image for the image displayed on the display surface 10 is suppressed.

While the concave mirror 11 is typically used to enlarge the image and to present the virtual image at a further distance, in this embodiment, as described above, besides these functions, it is used to suppress occurrence of the double image. As described above, the display apparatus 1 makes the optical path of the light beam L1 after the light beam L1 reflected on the front surface 21 of the transparent member 2 is reflected in the transparent member 2 and the optical path of the light beam L2 after the light beam L2 reflected on the rear surface 22 of the transparent member 2 is reflected in the transparent member 2 coincide with each other by the concave mirror 11. In other words, the display apparatus 1 makes the light beam L1 and the light beam L2 that reach the transparent member 2 from the display surface 10 incident on the transparent member 2 in parallel to each other by the concave mirror 11. Therefore, according to the display apparatus 1, it is possible to suppress occurrence of double image even when the transparent member 2 to present the images is not processed into a wedge shape.

It is known to use a special windshield in a vehicle that is equipped with a head-up display that directly reflects the image in the windshield in order to prevent the double image. An automotive windshield has a structure in which an intermediate film made of resin is held by two glasses so that even when the glass is broken, the fragments thereof will not be scattered. By using a special windshield formed of a laminated glass including the intermediate film having a wedge angle, it is possible to prevent the double image. However, there is a problem that this laminated glass is more expensive than normal glasses. On the other hand, in this embodiment, a normal windshield that does not have a wedge shape can be used as the transparent member 2. Accordingly, it is possible to suppress occurrence of the double image even when the expensive windshield is not used.

Modified Example

Figure 6:
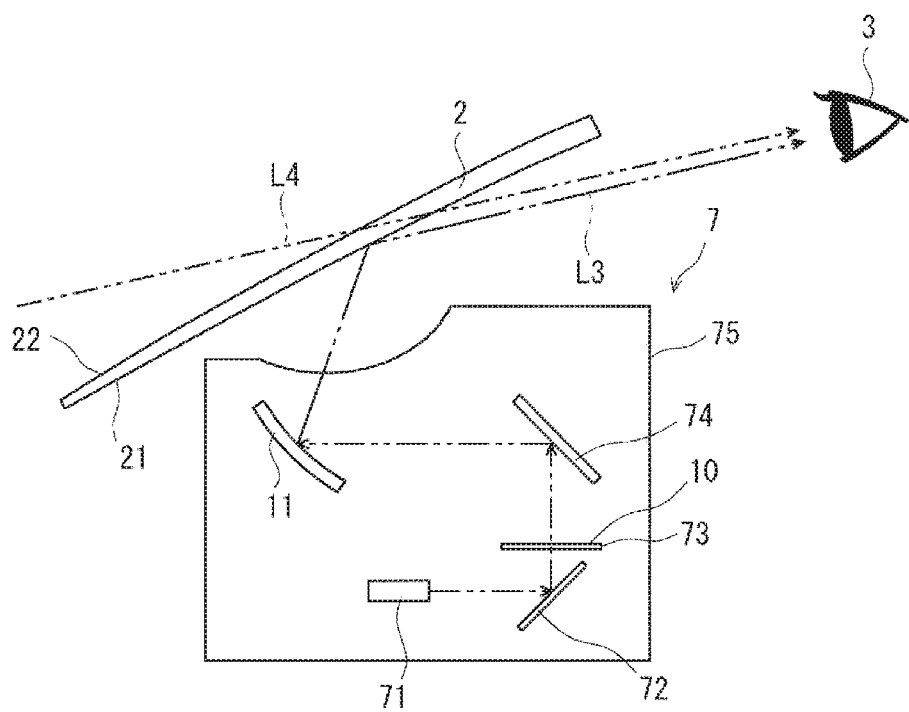
FIG. 6 is a schematic view showing one example of a structure of a display apparatus according to a modified example.

As described above, the display surface 10 is not limited to the display surface of the flat panel display 12 and may be a screen on which an image is projected by a projector. FIG. 6 is a schematic view showing one example of a structure of a display apparatus 7 according to a modified example. The display apparatus 7 includes a light emitting unit 71, a first plane mirror 72, a screen 73, a second plane mirror 74, a concave mirror 11, and a case 75.

With reference to FIG. 6, an optical path until a light beam L3 emitted from the light emitting unit 71 reaches the eye 3 of the user will be explained. The light beam L3 corresponds to the light beam L1 and the light beam L2 described above. The light emitting unit 71 raster-scans the laser beam using an optical scanner (not shown) that includes a scanning mirror, thereby displaying an image on the screen 73. The light beam L3 emitted from the light emitting unit 71 is reflected in the first plane mirror 72, which causes the optical path thereof to be bent, and is then incident on the screen 73. The light beam L3 forms an intermediate image of the display image on the screen 73. The screen 73 is a light-transmission type screen, and may be, for example, a diffusion plate or a micro lens array.

The light beam L3 emitted from the screen 73 is reflected in the second plane mirror 74, which causes the optical path thereof to be bent, and is then incident on the concave mirror 11. The light beam L3 reflected in the concave mirror 11 is emitted to the outside of the case 75 and is then made incident on the transparent member 2.

In the display apparatus 7, the light beam L3 emitted from an opening of the case 75 and reflected by the transparent member 2 and a light beam L4 that has transmitted the transparent member 2 overlap each other due to the presence of the transparent member 2 and then the overlapping light beams reach the eye 3 of the user. The user sees the image displayed on the display apparatus 7 as a virtual image overlapping with the landscape seen over the transparent member 2.

In this modified example as well, similar to the aforementioned embodiment, the curvature of the concave mirror 11 or the distance on the optical path from the display surface 10 of the screen 73 to the concave mirror 11 is adjusted. Therefore, the optical path of the first light beam after the first light beam that reaches the transparent member 2 from one point on the display surface 10 of the screen 73 and is reflected on the front surface of the transparent member 2 is reflected in the transparent member 2 and the optical path of the second light beam after the second light beam that reaches the transparent member 2 from this point and is reflected on the rear surface 22 of the transparent member 2 is reflected in the transparent member 2 coincide with each other. Accordingly, in the display apparatus 7 as well, it is possible to suppress occurrence of a double image even when the transparent member to present the images is not processed into a wedge shape. In FIG. 6, the distance on the optical path from the display surface 10 of the screen 73 becomes equal to the sum of the distance from the screen 73 to the second plane mirror 74 and the distance from the second plane mirror 74 to the concave mirror 11.

The present disclosure is not limited to the aforementioned embodiment and may be changed as appropriate without departing from the spirit of the present disclosure. For example, as shown in FIG. 6, a plane mirror may be provided on the optical path that connects the concave mirror 11 and the display surface 10. Further, the display apparatus is not limited to being used for an on-vehicle head-up display and may be used for a head-mounted display such as a helmet-mounted display or a spectacle type display.

What is claimed is:

1. A display apparatus comprising:
   a display surface configured to display an image; and
   a concave mirror configured to reflect light beams from the display surface toward a transparent member reflecting some of the light beams that have been input thereto and transmitting the remaining light beams that have been input thereto, the transparent member having a front surface and a rear surface parallel to each other, wherein
   a first light beam and a second light beam that reach the transparent member from one point on the display surface are incident on the transparent member in parallel to each other by the reflection in the concave mirror, the first light beam reflecting on the front surface of the transparent member, and the second light beam reflecting on the rear surface of the transparent member,
   an optical path of the first light beam after the first light beam is reflected in the transparent member and an optical path of the second light beam after the second light beam is reflected in the transparent member coincide on a common optical path from the front surface of the transparent member to a user, and
   a virtual image of the image is presented by the transparent member.

2. The display apparatus according to claim 1, wherein a curvature of the concave mirror or a distance on an optical path from the concave mirror to the display surface is adjusted in such a way that an optical path of the first light beam after the first light beam is reflected in the transparent member coincides with an optical path of the second light beam after the second light beam is reflected in the transparent member.

3. The display apparatus according to claim 1, wherein a curvature of the concave mirror or a distance on an optical path from the concave mirror to the display surface is adjusted in such a way that the first light beam and the second light beam are incident on the transparent member in parallel to each other.

4. The display apparatus according to claim 1, wherein the transparent member is a windshield.

5. A display method comprising:
   displaying an image on a display surface;
   reflecting light beams from the display surface toward a transparent member by a concave mirror, the transparent member reflecting some of the light beams that have been input thereto, transmitting the remaining light beams that have been input thereto and having a front surface and a rear surface parallel to each other; and
   presenting a virtual image of the image by the transparent member,
   wherein, in the reflection by the concave mirror, the reflection is performed in such a way that:
      a first light beam and a second light beam that reach the transparent member from one point on the display surface are incident on the transparent member in parallel to each other by the reflection in the concave mirror, the first light beam reflecting on the front surface of the transparent member, and the second light beam reflecting on the rear surface of the transparent member; and
      an optical path of the first light beam after the first light beam is reflected in the transparent member and an optical path of the second light beam after the second light beam is reflected in the transparent member coincide on a common optical path from the front surface of the transparent member to a user.

* * * * *